United States Patent
Hashimura et al.

(10) Patent No.: US 7,999,995 B2
(45) Date of Patent: Aug. 16, 2011

(54) FULL COLOR RANGE INTERFEROMETRIC MODULATION

(75) Inventors: Akinori Hashimura, Vancouver, WA (US); Douglas J. Tweet, Camas, WA (US); Apostolos T. Voutsas, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 129 days.

(21) Appl. No.: 12/568,522

(22) Filed: Sep. 28, 2009

(65) Prior Publication Data

US 2011/0075245 A1    Mar. 31, 2011

(51) Int. Cl.
G02B 26/00    (2006.01)

(52) U.S. Cl. ........ 359/291; 359/224; 359/292; 359/295; 359/298; 359/316; 345/108; 345/85; 348/770; 348/771

(58) Field of Classification Search .................. 359/223, 359/224, 290–292, 295, 298, 316; 345/108, 345/85; 348/770, 771
See application file for complete search history.

(56) References Cited

U.S. PATENT DOCUMENTS

| | | | |
|---|---|---|---|
| 5,835,255 A | 11/1998 | Miles | |
| 6,040,937 A | 3/2000 | Miles | |
| 6,055,090 A | 4/2000 | Miles | |
| 6,867,896 B2 * | 3/2005 | Miles | 359/290 |
| 7,221,497 B2 * | 5/2007 | Piehl et al. | 359/290 |
| 7,370,185 B2 * | 5/2008 | Piehl et al. | 359/290 |
| 2004/0218251 A1 * | 11/2004 | Piehl et al. | 359/290 |
| 2006/0018348 A1 * | 1/2006 | Przybyla et al. | 372/20 |
| 2006/0067633 A1 | 3/2006 | Gally et al. | |
| 2007/0139758 A1 * | 6/2007 | Miles | 359/290 |
| 2008/0191978 A1 * | 8/2008 | Miles | 345/84 |
| 2009/0135466 A1 | 5/2009 | Chui | |
| 2009/0219604 A1 * | 9/2009 | Miles | 359/290 |

FOREIGN PATENT DOCUMENTS

| | | |
|---|---|---|
| EP | 2148240 | 1/2010 |
| JP | 2001/201606 | 7/2001 |
| WO | WO 2006/037044 | 4/2006 |
| WO | WO 2009/120610 | 10/2009 |

* cited by examiner

*Primary Examiner* — Evelyn A. Lester
(74) *Attorney, Agent, or Firm* — Law Office of Gerald Maliszewski; Gerald Maliszewski

(57) ABSTRACT

A full color range analog controlled interferometric modulation device is provided. The device includes a transparent substrate, and a transparent fixed-position electrically conductive electrode with a bottom surface overlying the substrate. A transparent spacer overlies the fixed-position electrode, and an induced absorber overlies the spacer. An optically reflective electrically conductive moveable membrane overlies the induced absorber. A cavity is formed between the induced absorber and the moveable membrane having a maximum air gap dimension less than the spacer thickness. In one aspect, the distance from the top surface of the fixed-position electrode to a cavity lower surface is at least twice as great as the cavity maximum air gap dimension. In another aspect, at least one anti-reflective coating (ARC) layer is interposed between the substrate and the fixed-position electrode, and at least one ARC layer is interposed between the fixed-position electrode and the spacer.

22 Claims, 9 Drawing Sheets

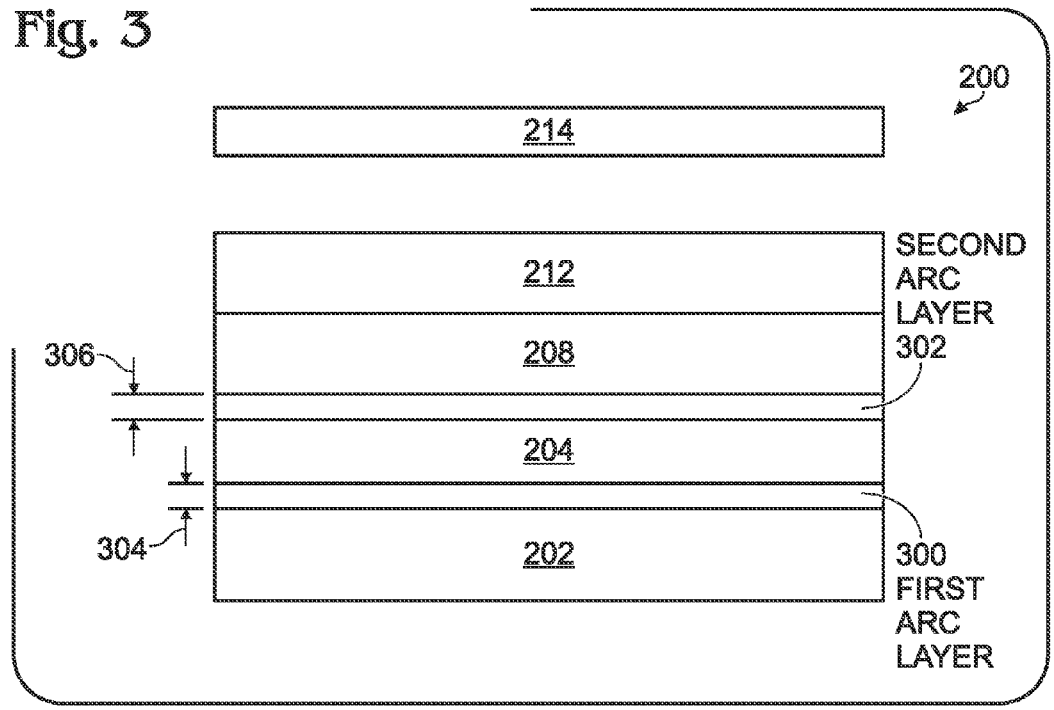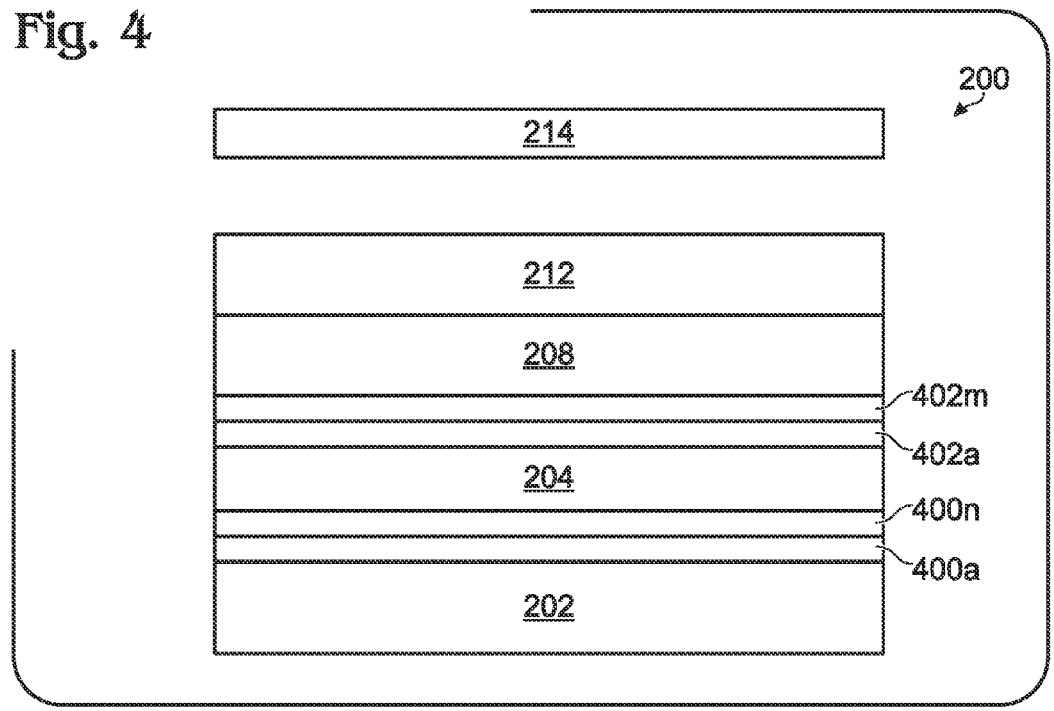

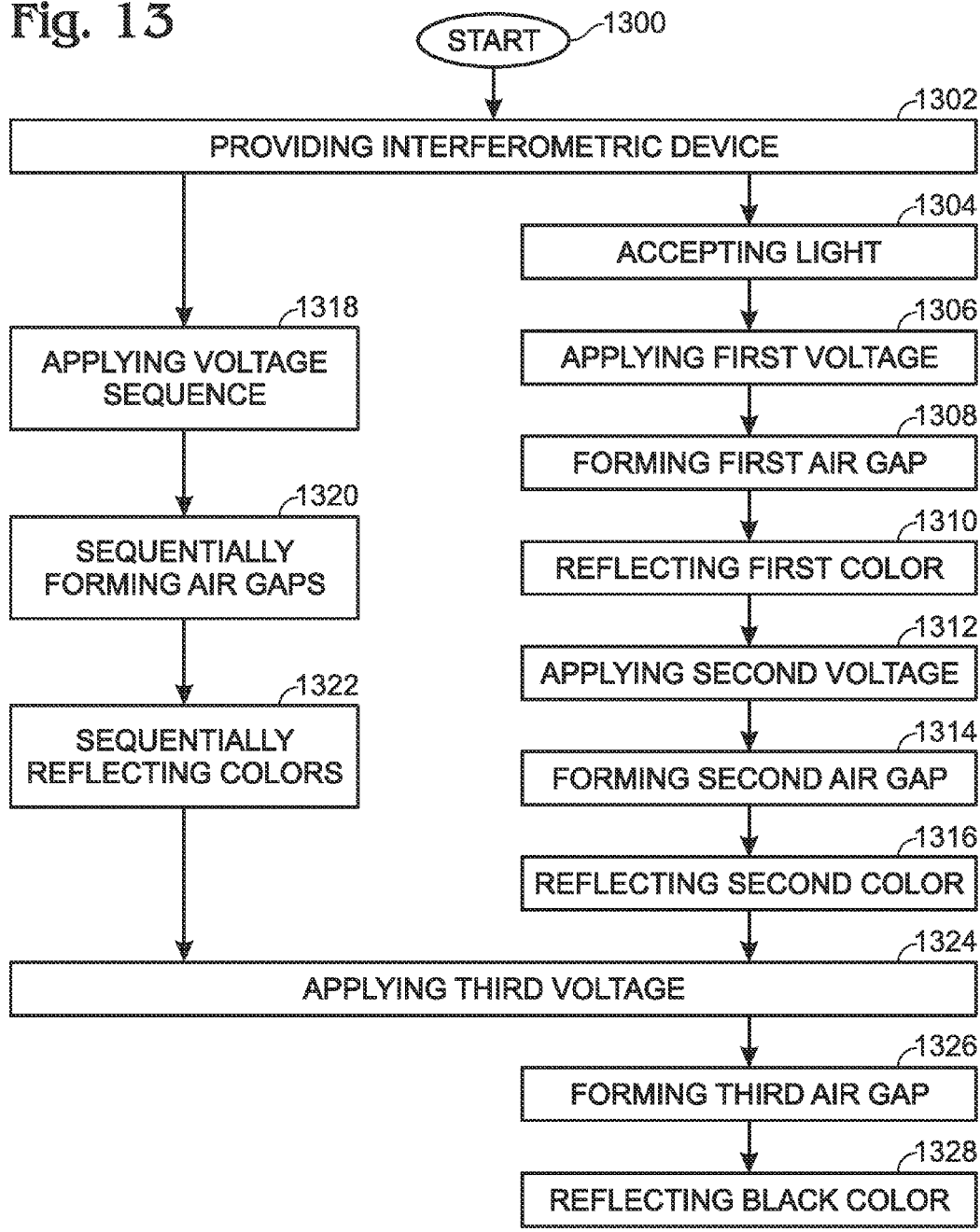

FULL COLOR RANGE INTERFEROMETRIC MODULATION

BACKGROUND OF THE INVENTION

1. Field of the Invention

This invention generally relates to microelectromechanical systems (MEMS) displays and, more particularly, to a system and method for full color range interferometric modulation.

2. Description of the Related Art

Recently, MEMS reflective displays have been developed using interferometric light modulation three subpixel (red, green, and blue (RGB)) devices. Advantageously, these displays do not require backlighting. Other colors are generated by mixing of these three primary colors. Moreover, grayscale images can be generated using spatial or temporal addressing of the three subpixels. However, since each pixel is divided into three subpixels, the total reflectance for a primary color can be no more than 33%. It would be much more desirable if a single pixel could generate all colors with 100% reflectivity.

FIG. 1 is a MEMS light valve switch expressed as a spring-damping-capacitor model (prior art). Using parallel-plate MEMS technology, a color can be tuned to a desired reflection by applying a voltage between the reflective movable plate and a transparent fixed-position actuation electrode by varying the air gap distance. However for electrostatic force, a non-linear state known as "pull-in" effect can occur at approximately one-third the air gap distance, where the movable plate snaps down to the actuating electrode. This effect limits the tuning range to less than one-third the gap distance, which is the reason three subpixels are conventionally required to generate the three primary colors.

When a voltage is applied to each side of the parallel-plate capacitor, the movable plate is pulled toward the bottom plate by attraction of Coulomb force:

$$F_{elec} = \frac{CV^2}{(g-d)^2}$$

where C is the capacitance area, V is the applied voltage, g is the initial gap, and d is the displacement distance. At sufficiently small displacements, the deflection reaches an equilibrium position due to opposing Hooke's Law:

$$F_{mech} = kd$$

However, when the displacement of the movable plate is larger than one-third the initial gap, i.e. $d > g/3$, the Hooke's force is not strong enough to balance the Coulomb force attraction. Therefore at this point, known as the pull-in voltage, the movable plate eventually snaps down to the non-equilibrium state.

The pull-in voltage is expressed as the following:

$$V_{pull-in} = \sqrt{\frac{8}{27} \frac{kg^3}{\varepsilon A}}$$

where $\varepsilon$ is the electrical permittivity of the material, and A is the area of the parallel-plate capacitor.

It would be advantageous if a MEMS parallel plate reflective display device could be tuned over a wider range of colors.

It would be advantageous if the gap of a MEMS parallel plate display device could be continuously tuned over a large distance using a wide range of analog control voltages without reaching the pull-in voltage.

SUMMARY OF THE INVENTION

The present invention addresses the issue of tuning a MEMS (microelectromechanical system) reflective display with very high reflectance over a broad range of colors. In order to increase the displacement range beyond the "pull-in" point (⅓ the air gap), a fixed-position actuation electrode is buried in a thick spacer, such as silicon dioxide ($SiO_2$), to control the air gap distance from the movable membrane, so that black, red, green, and blue colors can be reflected. To address the issue of oscillation (unintended reflection off the fixed-position electrode), induced into the reflectance due to the extra thickness of actuation electrode and spacer, anti-reflection coating films can be added to both sides of the fixed-position electrode.

Accordingly, a full color range analog controlled interferometric modulation device is provided. The device includes a transparent substrate, and a transparent fixed-position electrically conductive electrode with a bottom surface overlying the substrate. A transparent spacer overlies the fixed-position electrode, and an induced absorber overlies the spacer. An optically reflective electrically conductive moveable membrane overlies the induced absorber. A cavity is formed between the induced absorber and the moveable membrane having a maximum air gap dimension less than the spacer thickness. In one aspect, the distance from the top surface of the fixed-position electrode to a cavity lower surface is at least twice as great as the cavity maximum air gap dimension.

The device accepts a full spectrum light and, depending on the applied tuning voltage (air gap distance), selectively reflects every pure color in the visible spectrum. In one aspect, at least one anti-reflective coating (ARC) layer is interposed between the substrate and the fixed-position electrode, and at least one ARC layer is interposed between the fixed-position electrode and the spacer.

Additional details of the above-described interferometric modulation device, and a method for selectively reflecting pure colors in the visible spectrum using an analog controlled interferometric modulation device, are provided below.

BRIEF DESCRIPTION OF THE DRAWINGS

FIG. 3 is a partial cross-sectional view of a first variation of the interferometric modulation device of FIG. 2.

FIG. 4 is a partial cross-sectional view of a second variation of the interferometric modulation device of FIG. 2.

FIG. 13 is a flowchart illustrating a method for selectively reflecting pure colors in the visible spectrum using an analog controlled interferometric modulation device.

DETAILED DESCRIPTION

Figure 1:
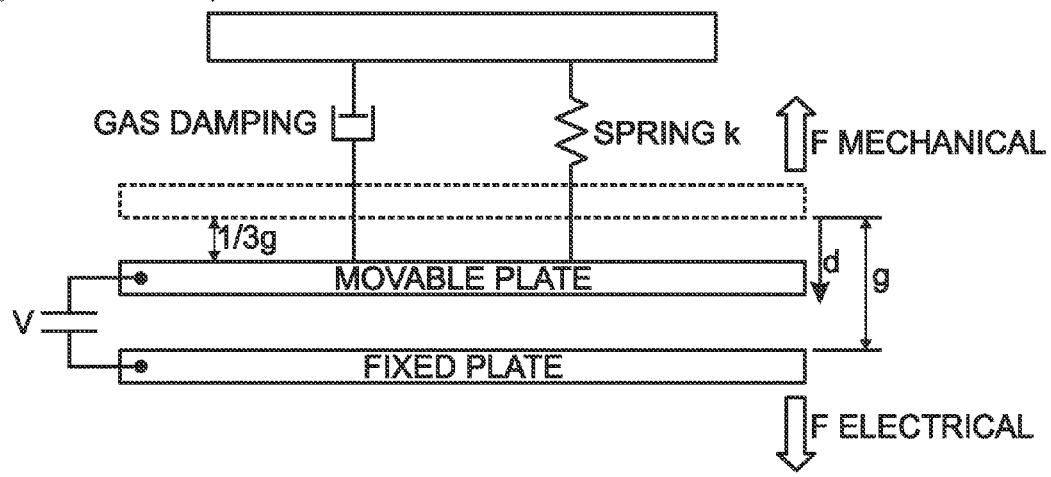
FIG. 1 is a MEMS light valve switch expressed as a spring-damping-capacitor model (prior art).
Figure 2:
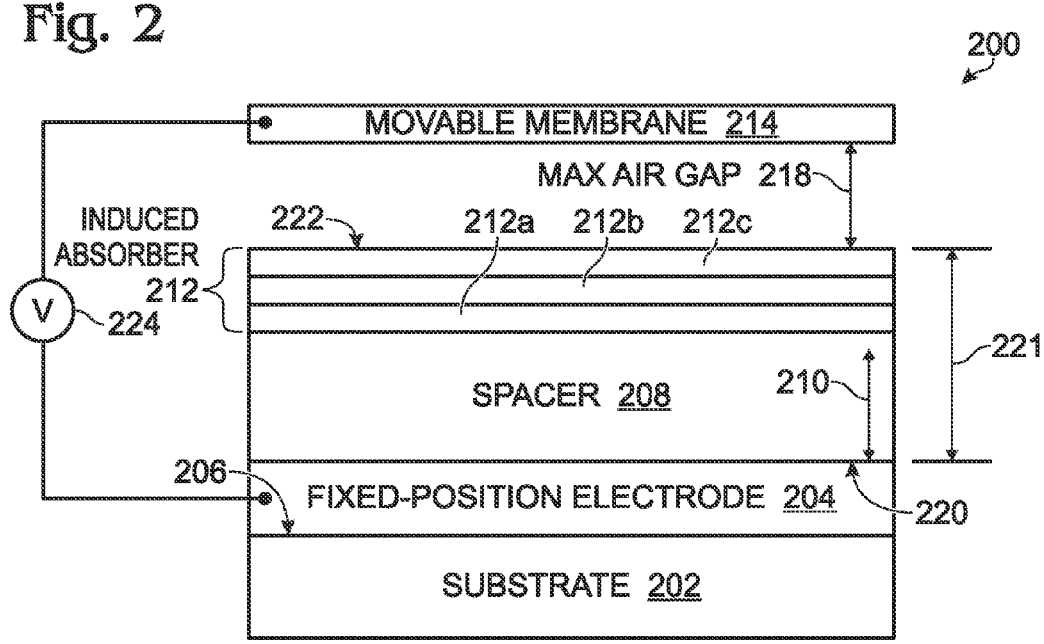
FIG. 2 is a partial cross-sectional view of a full color range analog controlled interferometric modulation device.

FIG. 2 is a partial cross-sectional view of a full color range analog controlled interferometric modulation device. The device 200 comprises a transparent substrate 202, made from a material such as plastic or glass. A transparent fixed-position electrically conductive electrode 204 with a bottom surface 206 overlies the substrate 202. The fixed-position electrode 204 can be made from a material such as indium tin oxide (ITO). A transparent spacer 208 with a thickness 210 overlies the fixed-position electrode 204. The spacer 208 may be silicon oxide or glass for example. An induced absorber 212 overlies the spacer 208. An optically reflective electrically conductive moveable membrane 214 overlies the induced absorber 212. The moveable membrane 214 may be a metal such as aluminum (Al), silver (Ag), molybdenum, molybdenum alloy, chromium, or combinations of the above-mentioned metals.

A cavity 216 with a maximum air gap dimension 218 is formed between the induced absorber 212 and the moveable membrane 214. The spacer thickness 210 is greater than the cavity maximum air gap dimension 218. In one aspect, the fixed-position electrode 204 has a top surface 220, and the distance 221 from the top surface 220 to a cavity lower surface 222 is at least twice as great as the cavity maximum air gap dimension 218. In this drawing, the cavity lower surface 222 is the same as the induced absorber top surface.

As noted in issued U.S. Pat. No. 6,040,937, entitled INTERFEROMETRIC MODULATION, invented by Mark Miles, an induced absorber 212 may include a first optical admittance matching layer 212a overlying the spacer 208. An optical absorbing layer 212b overlies the first matching layer 212a, and a second optical admittance matching layer 212c overlies the absorbing layer 212b. Generally, the induced absorber 212 matches the optical admittances of the incident medium 208 and moveable membrane 214. The induced absorber also absorbs incident light, except for the desired (tuned) color. Other induced absorber designs are also known, and the claimed device is not limited to any particular design or induced absorber materials. U.S. Pat. No. 6,040,937 is incorporated herein by reference.

The cavity air dimension is controlled by applying a voltage 224 between the moveable membrane 214 and the fixed-position electrode 204. The device 200 accepts a full spectrum light, through substrate 202, and selectively reflects every pure color in the visible spectrum in response to a corresponding cavity air gap dimension, which in turn, is responsive to a corresponding voltage 224. A pure color, as defined herein, exhibits a single (wavelength) peak in the visible spectrum, and where each color is responsive to a corresponding cavity air gap dimension.

FIG. 3 is a partial cross-sectional view of a first variation of the interferometric modulation device of FIG. 2. As shown, a first anti-reflective coating (ARC) layer 300 is interposed between the substrate 202 and the fixed-position electrode 204. A second ARC layer 302 is interposed between the fixed-position electrode 204 and the spacer 208. The first ARC layer 300 has a thickness 304, and the second ARC layer 302 has a thickness 306. The fixed position 204 electrode reflects less than 1% of light in the visible spectrum in response to the first and second ARC layer thicknesses 304 and 306, and the ARC indices of refraction. Typically, the first and second ARC layers 300/302 both have an index of refraction value in between the indices of refraction for glass and ITO. In one aspect, the first and second ARC layers 300/302 are silicon oxynitride (SiOxNy). For example, the ARC layers may be $SiO_{0.54}N_{0.46}$.

FIG. 4 is a partial cross-sectional view of a second variation of the interferometric modulation device of FIG. 2. In this aspect, a plurality of ARC layers 400a through 400n are interposed between the substrate 202 and the fixed-position electrode 204, where n is a variable not limited to any particular value. Likewise, a plurality of ARC layers 402a through 402m are interposed between the fixed-position electrode 204 and the spacer 208, where m is a variable not limited to any particular value. As shown, n=m=2.

For example, a first $SiOx_1Ny_1$ ARC layer 400a overlies the substrate 202, and first $SiOx_2Ny_2$ ARC layer 400n overlies the $SiOx_1Ny_1$ ARC layer 400a. A second $SiOx_2Ny_2$ ARC layer 402a overlies the fixed-position electrode 204, and a second $SiOx_1Ny_1$ ARC layer 402m overlies the second $SiOx_2Ny_2$ ARC layer 402a. The use of multiple ARC layer may reduce the relationship between spacer thickness and fixed-position electrode reflectivity. To continue the example, layers 400a and 402n may be $SiO_{0.78}N_{0.22}$ and layers 400n and 402a may be $SiO_{0.38}N_{0.62}$.

Functional Description

Figure 5:
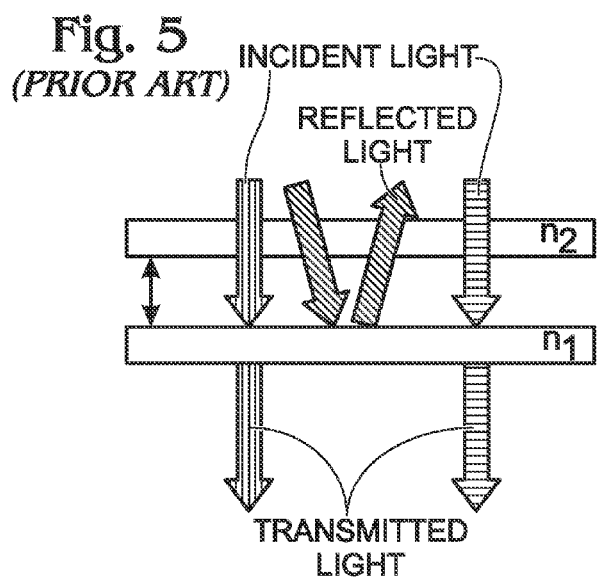
FIG. 5 is a diagram depicting a Fabry-Perot mode cavity (prior art).

FIG. 5 is a diagram depicting a Fabry-Perot mode cavity (prior art). The devices of FIGS. 2 through 4 use a one parallel-plate Fabry-Perot mode cavity to generate specific color wavelengths in the light spectrum. A single pixel, also known as spectral locus pixel has advantages over a three-pixel solution for the following reasons: (1) wider color gamut, i.e. hyper spectra with only pure color; (2) improved fill factor with no sub-pixel area; and, (3) higher reliability due to non-contact mode switching.

Figure 6:
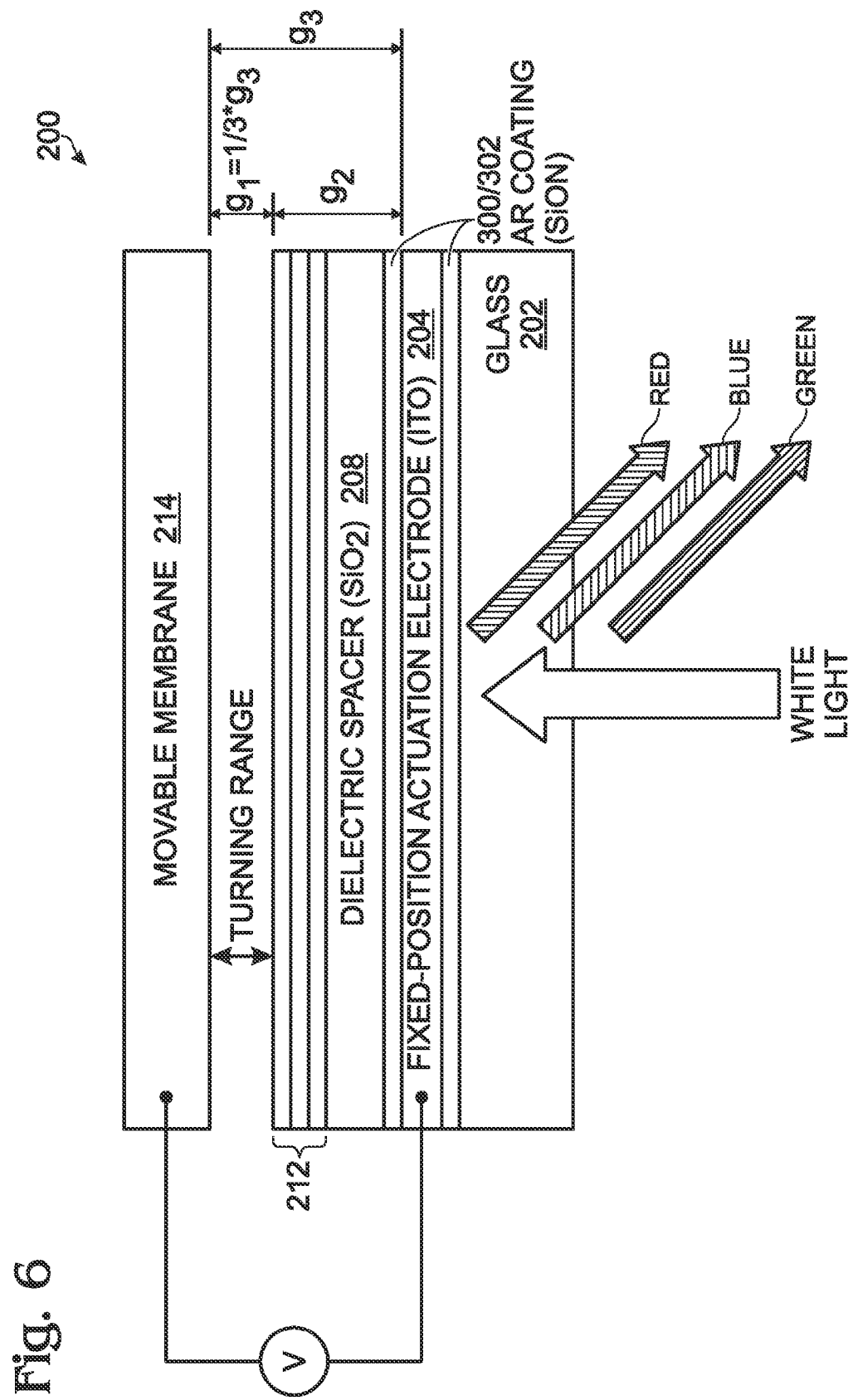
FIG. 6 is a partial cross-sectional view of the device of FIG. 3, with additional details.

FIG. 6 is a partial cross-sectional view of the device of FIG. 3, with additional details. To increase the displacement range of the movable membrane, a thick dielectric spacer 208 is added to the optical films above the ITO fixed-position actuation electrode 204. As shown in the figure, the addition of spacer increases the total amount of distance, $g_3$, between the actuation electrode 204 and the movable membrane 214. Therefore, the air gap distance, $g_1$, can be increased for tuning over the full color wavelength spectrum. ITO film 204 is buried below the silicon dioxide spacer 208 surface to control the black, R, G, and B, colors. The voltage is applied between the actuation electrode (ITO) and the movable membrane. The incident white light enters from the glass substrate, and reflects off the movable membrane.

Figure 7:
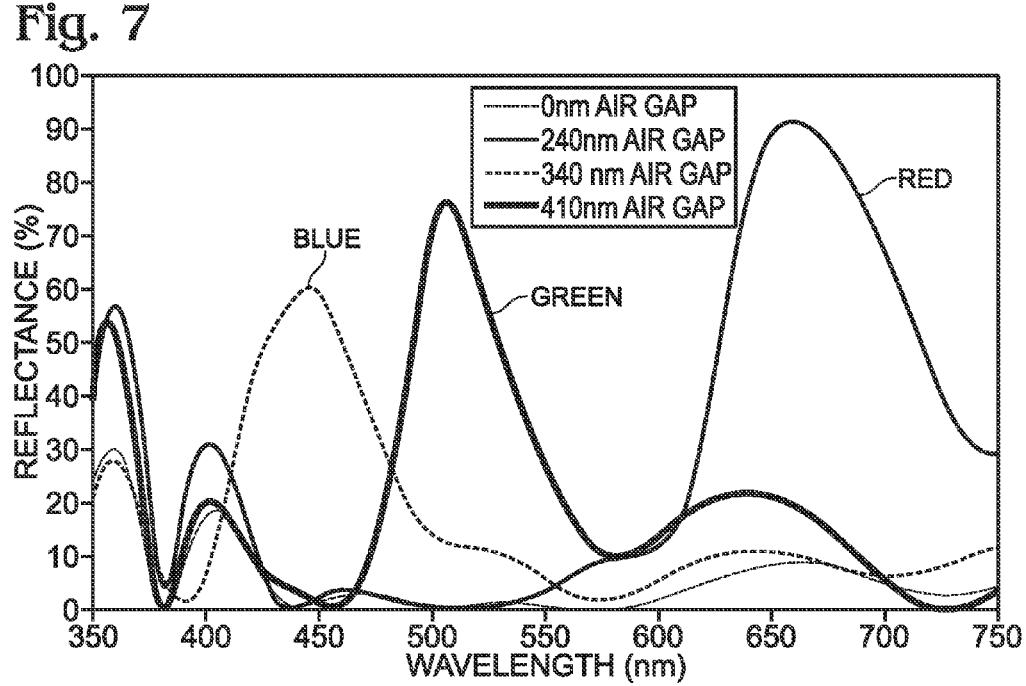
FIG. 7 is an optical simulation depicting reflection off of an ITO fixed-position electrode in a device not using ARC layers.

FIG. 7 is an optical simulation depicting reflection off of an ITO fixed-position electrode in a device not using ARC layers. Extra oscillations (reflections off the transparent electrode) are induced due to the thicknesses of the ITO and silicon dioxide in the optical films.

Figure 8:
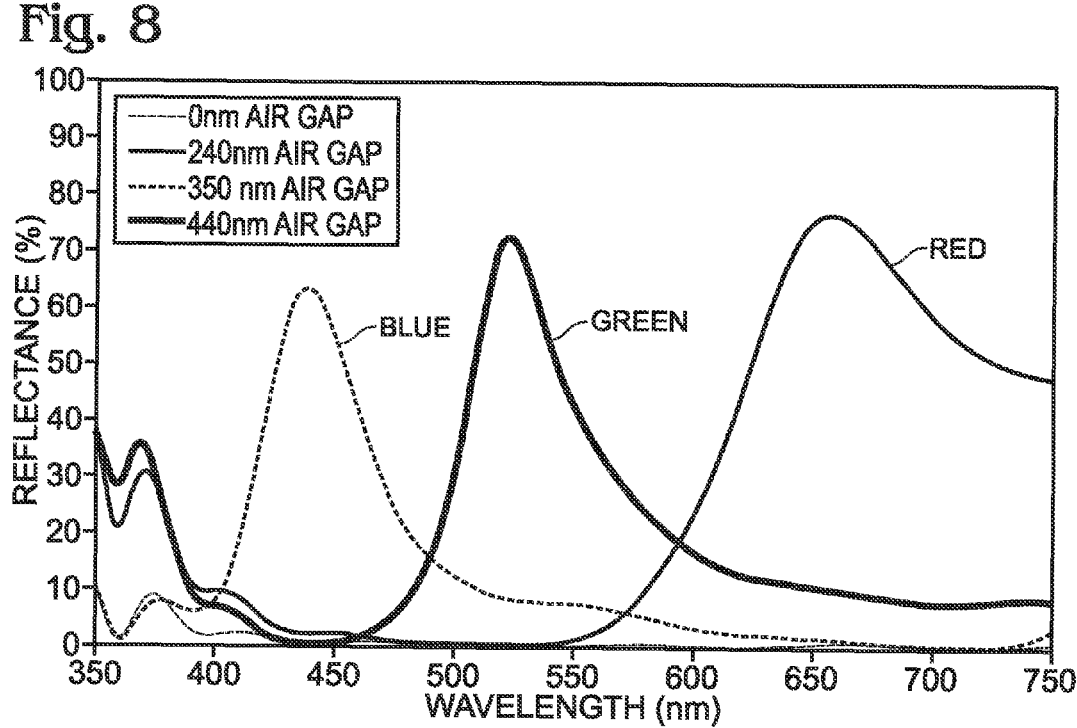
FIG. 8 is an optical simulation of the same device of FIG. 7, with ARC layers.

FIG. 8 is an optical simulation of the same device of FIG. 7, with ARC layers. As shown, a simple ARC film added to both sides of the fixed-position ITO electrode significantly reduces the extra oscillations in the color spectra, improving R, G, B, and black responses. The ARC material requires an index of refraction intermediate between ITO and glass, such as SiON.

From above results, the use of ARC significantly improves the optical performance of the device, and therefore a thick dielectric spacer can be used in the configuration to realize black, R, G, and B colors.

Figure 9:
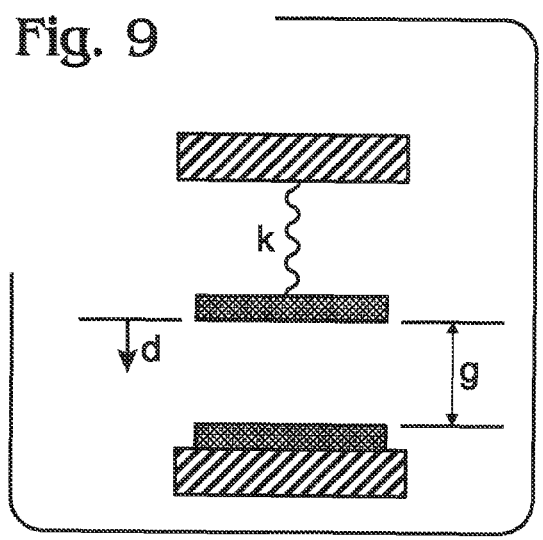
FIG. 9 is a mechanical schematic illustrating the pull-in voltage.

FIG. 9 is a mechanical schematic illustrating the pull-in voltage.

$$C = \varepsilon \frac{A_{el}}{g-d}$$

The force acting on the movable plate:

$$F = -\frac{\partial E}{\partial d} = \frac{1}{2}\frac{\varepsilon A_{el}}{(g-d)^2}V^2 - kd \qquad (1)$$

At equilibrium, the electrostatic force and spring force cancels (F=0) and the equation gives:

$$kd = \frac{1}{2}\frac{\varepsilon A_{el}}{(g-d)^2}V^2 \qquad (2)$$

The pull-in point is obtained by taking the derivative of equation (1) to obtain the stiffness of the system:

$$\frac{\partial F}{\partial d} = \frac{\varepsilon A_{el}}{(g-d)^3}V^2 - k \qquad (3)$$

Substituting equation (2) gives the stiffness around the equilibrium point:

$$\frac{\partial F}{\partial d} = \frac{2kd}{(g-d)} - k \qquad (4)$$

The point of instability (pull-in) is given by $$\frac{\partial F}{\partial d} = 0:$$

$$d = \frac{1}{3}g \qquad (5)$$

The purpose of the anti-reflection coating (ARC) is to make a fixed-position electrode optically invisible, so essentially it will have no effect on the optical performances. With proper design of the ARC layers, the spacer can be chosen for optimum electrical performance without sacrificing optical performance. The design of the ARC coating (thickness and index of refraction) is largely independent of the thickness of the spacer. If needed, the spacer can be larger than twice the maximum gap distance, but the ARC design needs only minor adjustments, if any, to make that fixed-position electrode optically invisible.

Figure 10:
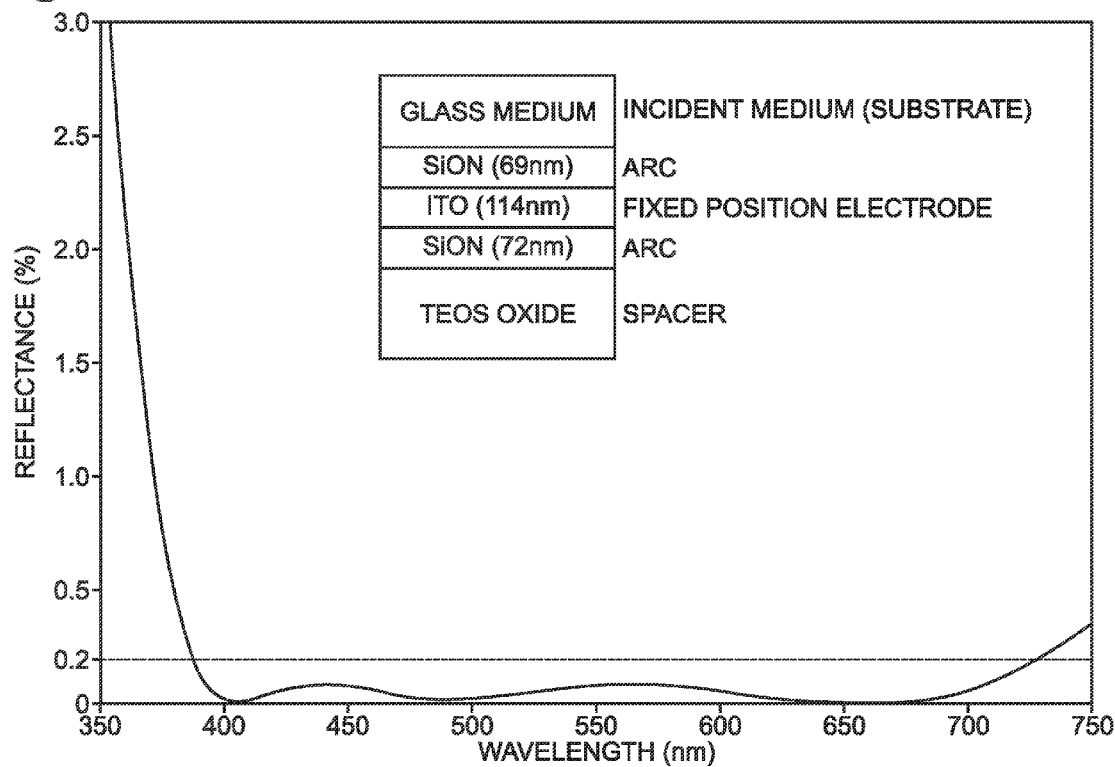
FIG. 10 is a graph depicting percentage of reflectivity in the fixed-position electrode at various wavelengths.

FIG. 10 is a graph depicting percentage of reflectivity in the fixed-position electrode at various wavelengths. The structure is made from SiON ARC layers. As can be seen from the simulation, at wavelengths greater than 400 nm, the reflectivity is less than 0.2%.

Figure 11:
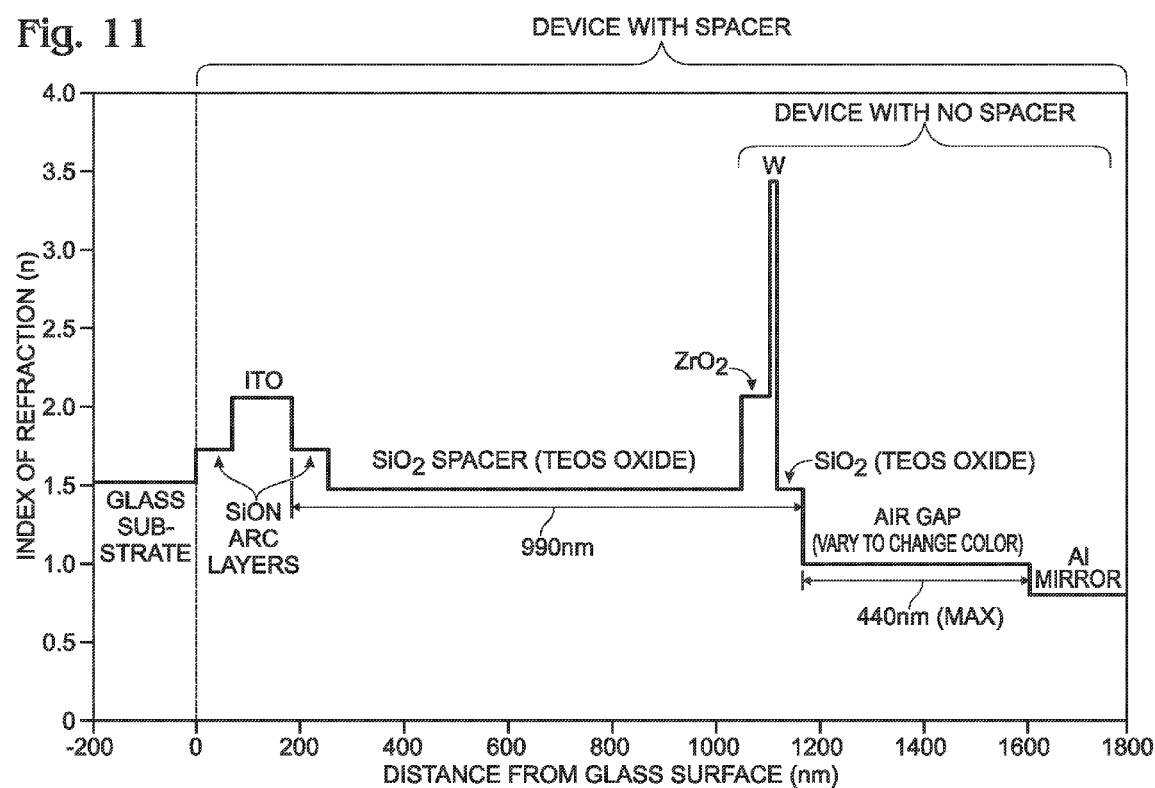
FIG. 11 is a plot of index of refraction vs. distance from the surface of the glass substrate for a model using a buried ITO fixed-position electrode with ARC layers.

FIG. 11 is a plot of index of refraction vs. distance from the surface of the glass substrate for a model using a buried ITO fixed-position electrode with ARC layers. In this example, the device with a spacer moves the air gap about 800 nanometers (nm) further away from the fixed-position electrode. The maximum air gap here is 440 nm, where the distance 221 (see FIG. 2) is 990 nm. A different spacer thickness can be chosen, as needed.

Figure 12:
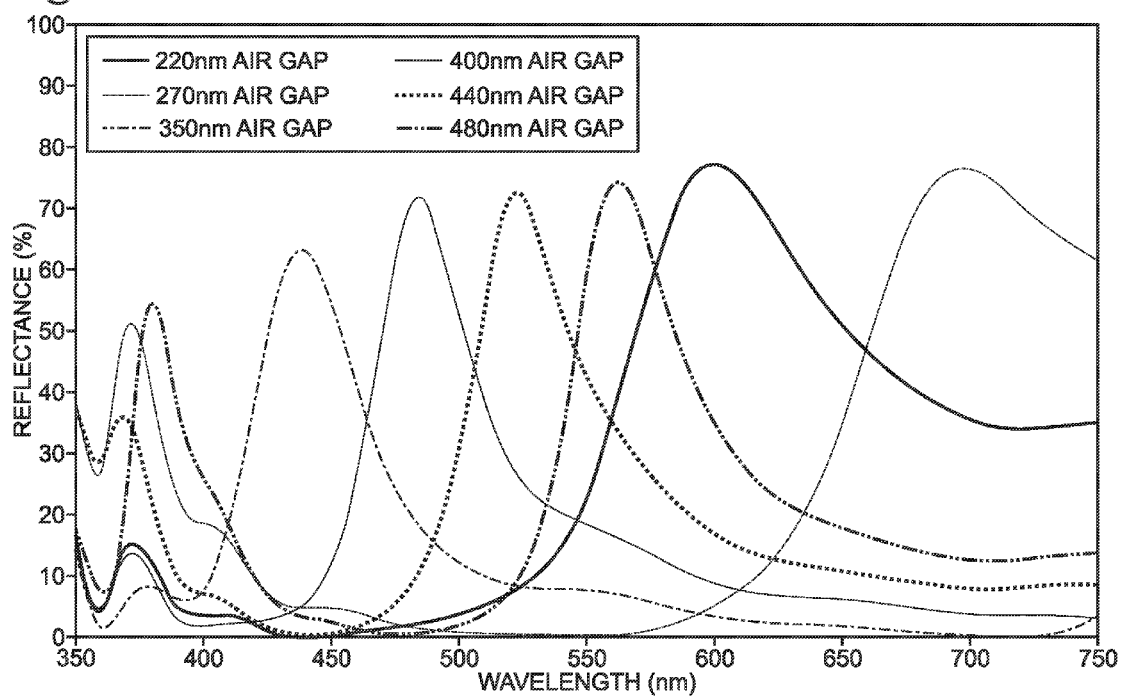
FIG. 12 is a plot of wavelength vs. reflectivity, depicting the full range of colors that may be obtained from tuning a single device.

FIG. 12 is a plot of wavelength vs. reflectivity, depicting the full range of colors that may be obtained from tuning a single device.

FIG. 13 is a flowchart illustrating a method for selectively reflecting pure colors in the visible spectrum using an analog controlled interferometric modulation device. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1300.

Step 1302 provides an interferometric device having a transparent spacer overlying a fixed-position electrode, an induced absorber overlying the spacer, a cavity overlying the induced absorber, and a moveable membrane electrode overlying the cavity. The distance from a top surface of the fixed-position electrode to a bottom surface of the cavity is greater than a cavity maximum air gap dimension. In one aspect, the distance between the fixed-position electrode top surface and the cavity lower surface is at least twice as great as the maximum cavity air gap dimension. In another aspect, the spacer is either glass or silicon oxide.

Step 1304 accepts a full color (white) light spectrum. Step 1306 applies a first voltage to the electrodes. In response to the first voltage, Step 1308 forms a first air gap dimension between the electrodes, and Step 1310 reflects a first color in a visible light spectrum. Step 1312 applies a second voltage to the electrodes, different than the first voltage. In response to the second voltage, Step 1314 forms a second air gap dimension between the electrodes, and Step 1316 reflects a second color in the visible light spectrum, other than black. In one aspect, reflecting the first and second colors in the visible light spectrum (Step 1310 and 1316) includes generating a color hue in response to time-domain multiplexing the first and second voltages (Steps 1308 and 1312).

In another aspect, Step 1318 applies a sequence of unique voltages to the electrodes. In response to the sequence of voltages, Step 1320 sequentially forms a corresponding plurality of air gap dimensions between the electrodes, and Step 1322 sequentially reflects a corresponding plurality of colors in the visible light spectrum. For example, Step 1322 may sequentially reflect red, blue, and green (and other) colors of light.

In a different aspect, Step 1324 applies a third voltage between the electrodes, different than the first and second voltages. In response to the third voltage, Step 1326 closes the air gap dimension between the electrodes, and Step 1328 reflects a black (no) color.

In one aspect, providing the interferometric device in Step 1302 includes providing at least one ARC layer interposed between the substrate and the fixed-position electrode, and at least one ARC layer interposed between the fixed-position electrode and the spacer. Steps 1310 and 1316 reflect less than 1% light in the visible spectrum from the fixed-position electrode in response to the first and second ARC layer thicknesses and indices of refraction.

A full color range analog controlled interferometric modulation device and associated tuning method have been provided. Explicit details of device structures have been used to illustrate the invention. However, the invention is not limited to merely these examples. Other variations and embodiments of the invention will occur to those skilled in the art.

We claim:

1. A full color range analog controlled interferometric modulation device comprising:
    a transparent substrate;
    a transparent fixed-position electrically conductive electrode with a bottom surface overlying the substrate;
    a transparent spacer with a thickness overlying the fixed-position electrode;
    an induced absorber overlying the spacer;
    an optically reflective electrically conductive moveable membrane overlying the induced absorber;
    a cavity with a maximum air gap dimension between the induced absorber and the moveable membrane; and,
    wherein the spacer thickness is greater than the cavity maximum air gap dimension.

2. The device of claim 1 wherein the fixed-position electrode has a top surface, and the distance from the top surface to a cavity lower surface is at least twice as great as the cavity maximum air gap dimension.

3. The device of claim 1 wherein the cavity air dimension is controlled by applying a voltage between the moveable membrane and the fixed-position electrode.

4. The device of claim 1 wherein the device accepts a full spectrum light and selectively reflects every pure color in the visible spectrum, where a pure color exhibits a single peak in the visible spectrum, and where each color is responsive to a corresponding cavity air gap dimension.

5. The device of claim 1 further comprising:
    a first anti-reflective coating (ARC) layer interposed between the substrate and the fixed-position electrode; and,
    a second ARC layer interposed between the fixed-position electrode and the spacer.

6. The device of claim 5 wherein the first and second ARC layers have thicknesses; and,
    wherein the fixed position electrode reflects less than 1% of light in the visible spectrum in response to the first and second ARC layer thicknesses and indices of refraction.

7. The device of claim 5 wherein the substrate is glass;
    wherein the fixed-position electrode is indium tin oxide (ITO); and,
    wherein the first and second ARC layers have an index of refraction value in between the indices of refraction for glass and ITO.

8. The device of claim 7 wherein the first and second ARC layers are silicon oxynitride (SiOxNy).

9. The device of claim 1 further comprising:
    a plurality of ARC layers interposed between the substrate and the fixed-position electrode; and,
    a plurality of ARC layers interposed between the fixed-position electrode and the spacer.

10. The device of claim 1 further comprising:
    a first $SiOx_1Ny_1$ ARC layer overlying the substrate;
    a first $SiOx_2Ny_2$ ARC layer overlying the first $SiOx_1Ny_1$ ARC layer;
    a second $SiOx_2Ny_2$ ARC layer overlying the fixed-position electrode; and,
    a second $SiOx_1Ny_1$ ARC layer overlying the second $SiOx_2Ny_2$ ARC layer.

11. The device of claim 1 wherein the moveable membrane is a metal selected from a group consisting of aluminum (Al), silver (Ag), molybdenum, molybdenum alloy, chromium, and combinations of the above-mentioned metals.

12. The device of claim 1 wherein the induced absorber includes:
    a first optical admittance matching layer overlying the spacer;
    an optical absorbing layer overlying the first matching layer; and,
    a second optical admittance matching layer overlying the absorbing layer.

13. The device of claim 1 wherein the spacer is a material selected from a group consisting of silicon oxide and glass.

14. A method for selectively reflecting pure colors in the visible spectrum using an analog controlled interferometric modulation device, the method comprising:
    providing an interferometric device having a transparent spacer overlying a fixed-position electrode, an induced absorber overlying the spacer, a cavity overlying the induced absorber, and a moveable membrane electrode overlying the cavity, where the distance from a top surface of the fixed-position electrode to a bottom surface of the cavity is greater than a cavity maximum air gap dimension;
    accepting a full color light spectrum;
    applying a first voltage to the electrodes;
    in response to the first voltage, forming a first air gap dimension between the electrodes;
    reflecting a first color in a visible light spectrum;
    applying a second voltage to the electrodes, different than the first voltage;
    in response to the second voltage, forming a second air gap dimension between the electrodes; and
    reflecting a second color in the visible light spectrum.

15. The method of claim 14 further comprising:
    applying a sequence of unique voltages to the electrodes;
    in response to the sequence of voltages, sequentially forming a corresponding plurality of air gap dimensions between the electrodes; and
    sequentially reflecting a corresponding plurality of colors in the visible light spectrum.

16. The method of claim 15 wherein sequentially reflecting the corresponding plurality of colors in the visible light spectrum includes sequentially reflecting red, blue, and green colors of light.

17. The method of claim 15 further comprising:
    applying a third voltage between the electrodes, different than the first and second voltages;
    in response to the third voltage, closing the air gap dimension between the electrodes; and
    reflecting a black color.

18. The method of claim 14 wherein reflecting the first and second colors in the visible light spectrum includes generating a color hue in response to time-domain multiplexing the first and second voltages.

19. The method of claim 14 wherein providing the interferometric device includes providing a distance between the fixed-position electrode top surface and the cavity lower surface that is at least twice as great as the maximum cavity air gap dimension.

20. The method of claim 19 wherein providing the interferometric device includes providing a spacer made from a material selected from a group consisting of glass and silicon oxide.

21. The method of claim 14 wherein providing the interferometric device includes providing:

at least one anti-reflective coating (ARC) layer interposed between the substrate and the fixed-position electrode; and, at least one ARC layer interposed between the fixed-position electrode and the spacer.

22. The method of claim 21 wherein providing the interferometric device includes providing first and second ARC layers have thicknesses; and, wherein reflecting the first and second colors includes reflecting less than 1% light in the visible spectrum from the fixed-position electrode in response to the first and second ARC layer thicknesses and indices of refraction.

* * * * *